(12) United States Patent
DelPriore et al.

(10) Patent No.: US 8,702,570 B1
(45) Date of Patent: Apr. 22, 2014

(54) PORTABLE MULTI-PURPOSE EXERCISE DEVICE

(76) Inventors: Nunzio DelPriore, Freehold, NJ (US); Angelica DelPriore, Brooklyn, NY (US)

( * ) Notice: Subject to any disclaimer, the term of this patent is extended or adjusted under 35 U.S.C. 154(b) by 374 days.

(21) Appl. No.: 13/249,872

(22) Filed: Sep. 30, 2011

Related U.S. Application Data

(60) Provisional application No. 61/423,884, filed on Dec. 16, 2010.

(51) Int. Cl.
*A63B 22/00* (2006.01)
*A63B 21/02* (2006.01)
*A63B 22/04* (2006.01)

(52) U.S. Cl.
USPC ................ 482/51; 482/52; 482/123; 482/142

(58) Field of Classification Search
USPC ......... 482/23, 25, 44–49, 51, 52, 79, 80, 110, 482/121–126, 129, 130, 133, 135, 136, 141, 482/142, 146, 147, 910
See application file for complete search history.

(56) References Cited

U.S. PATENT DOCUMENTS

| | | | | |
|---|---|---|---|---|
| 4,743,018 A | * | 5/1988 | Eckler | 482/106 |
| 4,856,775 A | | 8/1989 | Colledge et al. | |
| 5,118,096 A | * | 6/1992 | Wilkinson et al. | 482/52 |
| 5,292,297 A | * | 3/1994 | Hsu | 482/146 |
| 5,697,870 A | * | 12/1997 | Osborn | 482/52 |
| 5,716,305 A | * | 2/1998 | Selsam | 482/93 |
| 5,813,953 A | | 9/1998 | Whipple | |
| 5,839,991 A | | 11/1998 | Hall | |
| 6,093,136 A | * | 7/2000 | Whipple | 482/123 |
| 6,193,638 B1 | | 2/2001 | Barrett | |
| 6,315,701 B1 | | 11/2001 | Shifferaw | |
| 6,612,170 B2 | | 9/2003 | Brown | |
| 6,634,998 B2 | * | 10/2003 | Siaperas | 482/142 |
| 6,663,545 B2 | | 12/2003 | Wilson | |
| 6,716,145 B1 | * | 4/2004 | Manailovich | 482/141 |
| 6,976,942 B2 | | 12/2005 | Kennedy | |
| 7,001,315 B1 | * | 2/2006 | Diodati | 482/121 |
| D532,062 S | | 11/2006 | Potak et al. | |
| 7,134,987 B2 | * | 11/2006 | Goldstein | 482/141 |
| 7,244,220 B2 | * | 7/2007 | Carney | 482/106 |
| 7,364,538 B2 | | 4/2008 | Aucamp | |
| 7,591,763 B1 | * | 9/2009 | Fucci | 482/52 |
| 7,608,025 B1 | * | 10/2009 | Best | 482/123 |
| 2002/0151417 A1 | * | 10/2002 | List | 482/123 |
| 2002/0160891 A1 | * | 10/2002 | Gallagher | 482/123 |
| 2006/0217247 A1 | | 9/2006 | Potak et al. | |
| 2009/0156378 A1 | | 6/2009 | Wang | |
| 2011/0077136 A1 | * | 3/2011 | Tozzi | 482/141 |
| 2012/0283073 A1 | * | 11/2012 | Zabel | 482/93 |

FOREIGN PATENT DOCUMENTS

| | | |
|---|---|---|
| WO | WO02087705 | 11/2002 |
| WO | WO03095034 | 11/2003 |

\* cited by examiner

*Primary Examiner* — Loan Thanh
*Assistant Examiner* — Gregory Winter
(74) *Attorney, Agent, or Firm* — Goldstein Law Offices, P.C.

(57) ABSTRACT

A portable multi-purpose exercise device includes a base having a top side and a bottom side. A portion of the bottom side projects away from the top side. A plurality of foldable legs is coupled to the bottom side. A plurality of rotatable handles is coupled to the base. The rotatable handles are accessible from the bottom side. The rotatable handles avoid contact with a ground surface when the legs are in contact with the ground surface.

8 Claims, 11 Drawing Sheets

PORTABLE MULTI-PURPOSE EXERCISE DEVICE

CROSS-REFERENCE TO RELATED APPLICATIONS

This application claims priority to and benefit of U.S. Provisional Application No. 61/423,884, filed on Dec. 16, 2010, which is herein incorporated by reference in its entirety.

TECHNICAL FIELD

The present invention relates generally to portable exercise equipment. More particularly, the present invention relates to a portable multi-purpose exercise device.

BACKGROUND

Health benefits of physical exercise are widely known. In an attempt to exploit such knowledge, a wide variety of home exercise devices is currently marketed to consumers for home use. Some of such devices include large structures intended to provide a gym-type environment in the home and small devices intended to provide a mechanism to exercise a particular body part or a muscle group. Nevertheless, a typical user is often inconvenienced by drawbacks that are frequently associated with such devices. Some of the drawbacks include bulkiness, lack of durability and a limited exercise range.

Furthermore, some individuals use home gyms or health clubs to follow an exercise regimen. Due to travel requirements, such as for business, the exercise regimen is often interrupted, thus leading to frustration among the individuals. Although some portable exercise devices have been developed in order to accommodate the frustrated individuals, such devices are similarly associated with bulkiness, lack of durability and inability to sufficiently mimic workouts as performed in the home gym or the health club.

What is needed are better, more efficient ways of dealing with the foregoing issues or inconveniences.

BRIEF SUMMARY

An example embodiment of the invention is a portable multi-purpose exercise device, which includes a base having a top side and a bottom side. A portion of the bottom side projects away from the top side. A plurality of foldable legs is coupled to the bottom side. A plurality of rotatable handles is coupled to the base. The rotatable handles are accessible from the bottom side. The rotatable handles avoid contact with a ground surface when the legs are in contact with the ground surface.

An example embodiment of the invention is a method of manufacturing a portable multi-purpose exercise device. The method includes coupling a plurality of side handles to a plurality of handle sides of a base. The base includes a top side and a bottom side. A portion of the bottom side projects away from the top side. Each handle side is adjacent to the top side and the bottom side. The method also includes coupling a plurality of foldable legs to the bottom side. The method further includes coupling a plurality of rotatable handles to the base. The rotatable handles are accessible from the bottom side. The rotatable handles avoid contact with a ground surface when the legs are in contact with the ground surface. The method even further includes coupling a shaft to a shaft side of the base. The shaft side is adjacent to the top side and the bottom side. The method yet even further includes mounting a pulley rotatable element on the shaft. The method yet still even further includes creating a plurality of inward bowl-like projections on a plurality of corners of the base. Each projection includes a pin extending from one side of the projection to another side of the projection.

An example embodiment of the invention is a portable multi-purpose exercise device, which includes a base having a top side and a bottom side. The top side includes a slip resistant portion. A portion of the bottom side projects away from the top side. The base is hourglass shaped along a base length or along a base width. The base has an interior space defined therein. The interior space includes a plurality of compartments. The bottom side includes a cover covering the interior space. A central portion of the cover projects away from the top side. A plurality of side handles is coupled to a plurality of handle sides of the base. Each handle side is adjacent to the top side and the bottom side. The side handles project outward. At least four foldable legs are coupled to four distinct corners of the bottom side. The legs fold into a plurality of grooves within the base. A plurality of rotatable handles is coupled to the base. The rotatable handles are accessible from the bottom side. The rotatable handles avoid contact with a ground surface when the legs in contact with the ground surface. A shaft is coupled to a shaft side of the base. The shaft side is adjacent to the top side and the bottom side. The shaft side includes a wheel groove. The handle sides are adjacent to the shaft side. A pulley wheel is mounted on the shaft. The wheel rotates within the wheel groove. A plurality of inward bowl-like projections is stationed on a plurality of corners of the base. Each projection includes a pin extending from one side of the projection to another side of the projection.

BRIEF DESCRIPTION OF THE DRAWINGS

Objects, features and advantages of the present invention will become apparent to a skilled artisan in view of the following detailed description taken in combination with the attached drawings. In the drawings, like elements are depicted by like reference numerals. The drawings are briefly described as follows.

DETAILED DESCRIPTION OF THE PREFERRED EMBODIMENTS

Figure 1:
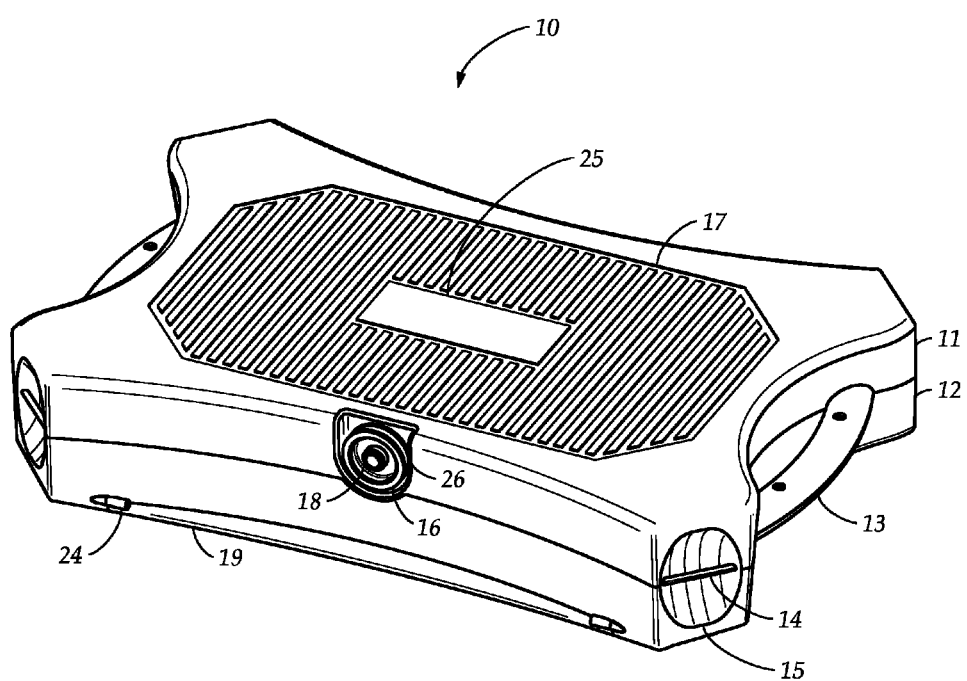
FIG. 1 is a perspective view of an example embodiment of a portable multi-purpose exercise device according to the present invention.

The present invention now will be described more fully hereinafter with reference to the accompanying drawings, which show various example embodiments. However, the present invention may be embodied in many different forms and should not be construed as limited to the embodiments set forth herein. Rather, these embodiments are provided so that the present disclosure is thorough, complete and fully conveys the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will also be understood that, although the terms "first," "second," "third" etc. may be used herein to describe various elements, components, regions, layers and/Page or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature (s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view of an example embodiment of a portable multi-purpose exercise device according to the present invention.

A multi-purpose exercise device 10 includes a base having an upper portion 11 and a lower portion 12 defining an interior space therein. Alternatively, device 10 has one body with interior space defined therein. Upper portion 11 or lower portion 12 include plastic.

A slip resistant portion 17 is disposed on an upper external portion of upper portion 17. Within slip resistant portion 17 is an island 25. Although slip resistant portion 17 includes ridges, other types of slip resistant surfaces, such as rubber, can be used as well.

A speed pulley wheel 16 rotates within a groove 26 of upper portion 11. Wheel 16 is mounted on a shaft 18. A user can couple a rope to wheel 18 to perform a variety of rope exercises, such as described below. Alternatively, wheel 16 can be of non-circular shape, such as triangular, star, oval or rectangular. Alternatively, wheel 16 rotates within groove 26 of lower portion 12.

A plurality of handles 13 is attached on opposing shorter sides of device 10. Although handles 13 project outward, away from island 25, handles 13 can project inward, toward island 25. Handles 13 can be rotatable and can include hand grip enhancements, cushions or germ or sweat resistant coatings. A user can hold device 10 by handles 13.

A plurality of inward bowl-like projections 15 are set on a plurality of corners of device 10. Each projection includes a pin 14 secured within. Pin 14 can include metal, such as steel. Pin 14 can swing outward, away from the base. A user of device 10 can swing pin 14 outward, loop resistance bands around pin 14 and then, if desired, swing pin 14 inward, toward the base, to secure the loop or leave pin 14 in a swung position for exercise. Alternatively, pin 14 can be permanently secured within. Alternatively, a hook can be used in place of pin 14.

Lower portion 12 includes a removable cover 19 attached to a hinge 24. Alternatively, cover 19 can be completely removable. Cover 19 can include plastic. Cover covers the interior space of device 10 to secure interior contents within.

Device 10 has an hourglass shape along its length or along its width. Although an extent of side inward projection varies between adjacent sides of device 10, all sides can equally project inward or all sides can vary in the extent of inward projection. Alternatively, side outward projection is possible as well. Further, although adjacent sides vary in length, all sides can have equal lengths or all sides can vary in lengths.

In an example embodiment, upper portion 11 can be coupled to a rigid platform attached to an inflatable hemisphere, such as a rubber hemisphere.

Figure 2:
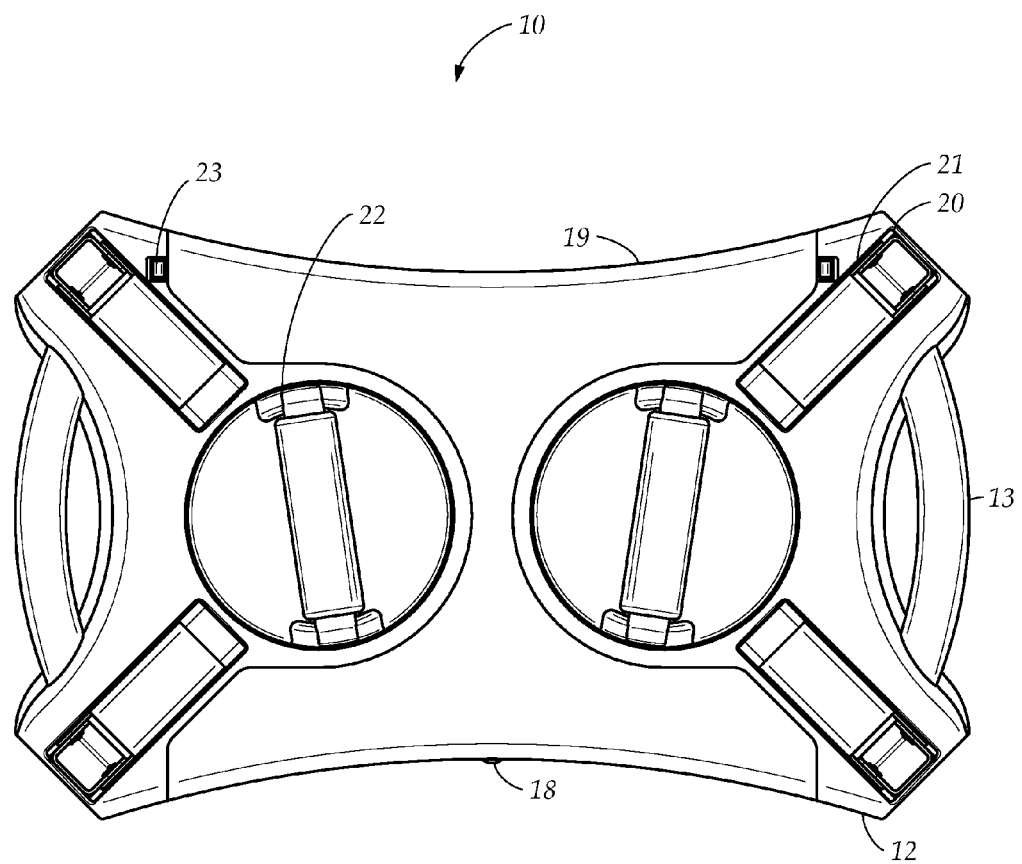
FIG. 2 is a bottom view of an example embodiment of a portable multi-purpose exercise device according to the present invention.

FIG. 2 is a bottom view of an example embodiment of a portable multi-purpose exercise device according to the present invention.

Some elements of FIG. 2 are described above with respect to FIG. 1. Thus, same reference characters identify same or like components described above and any repetitive detailed description thereof will hereinafter be omitted or simplified in order to avoid complication.

Lower portion 12 includes a plurality of rotatable handles 22. Handles 22 can rotate freely or under set tension. A user of device 10 can hold device 10 by handles 22.

Lower portion 12 includes a plurality of legs 20 foldable into a plurality of grooves 21. Legs 20 fold out away from handles 22 and fold inward toward handles 22. Alternatively, legs 20 fold out toward handles 22 and fold inward away from handles 22.

The interior space within lower portion 12 is covered by cover 19. A snap 23 keeps cover 19 securely closed. A user can open cover 19 by pressing snap 23. Within the interior space covered by cover 19 is a plurality of slotted compartments, which can be used to securely store items, such as a cell phone, extra weights, weighted handles, resistance bands, speed wheel rope. One of the compartments, which can be between handles 22, has an hourglass shape.

In an example embodiment, slip resistant portion 17 includes a weight scale with island 25 being a weight scale display. If the weight scale is electronic, then the scale is powered via a power source, such as a battery. Alternatively, the weight scale is powered via a rotational movement of rotatable handles 22.

In an example embodiment, slip resistant portion 17 includes a calorie counter with island 25 being a calorie counter display. The calorie counter can also include a body fat measurer, a pulse measurer and a heart rate measurer. The calorie counter can be powered via a power source, such as a battery. Alternatively, the calorie counter is powered via a rotational movement of rotatable handles 22.

In an example embodiment, interconnected within device 10 is a power source, a processor, a memory, a speaker and a communication means, such as a network card or a standardized communication/power port for connection to a computer peripheral, such as a smartphone. For example, a customized workout instruction program to be output via the speaker can be wirelessly downloaded from another device or a network, such as Internet. Also, device 10 can connect to a video game console to play an exercise game alone or participate in a competition with other users having similar devices. The power source can be a battery or via a rotational movement of rotatable handles 22.

Figure 3:
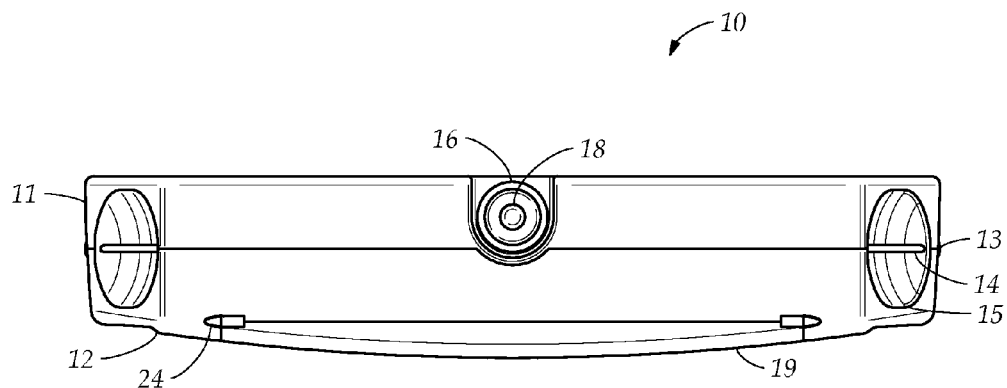
FIGS. 3 and 3A are front side views of an example embodiment of a portable multi-purpose exercise device with legs folded and unfolded according to the present invention.
Figure 3A:
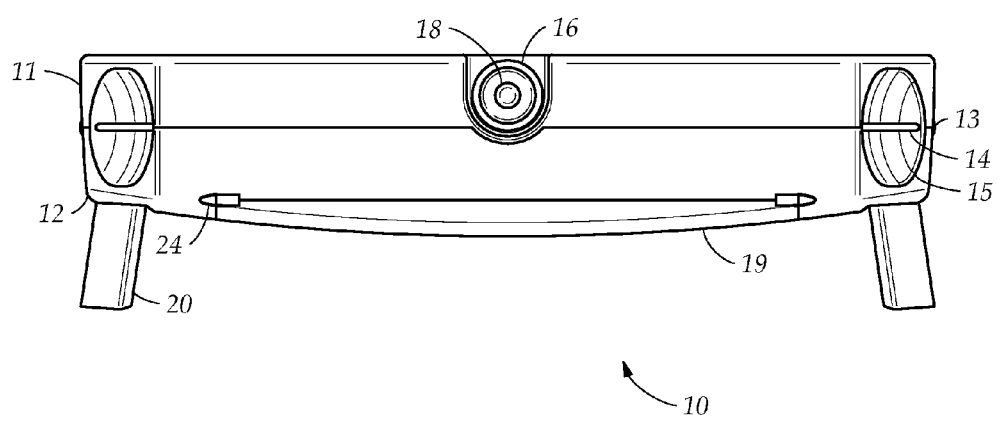

FIGS. 3 and 3A are front side views of an example embodiment of a portable multi-purpose exercise device with legs folded and unfolded according to the present invention.

Some elements of FIGS. 3 and 3A are described above with respect to FIGS. 1 and 2. Thus, same reference characters identify same or like components described above and any repetitive detailed description thereof will hereinafter be omitted or simplified in order to avoid complication.

Cover 19 and a portion of lower portion 12 is curved and projects outward away from upper portion 11.

While in FIG. 3 legs 20 are in a folded-in state, in FIG. 3A legs are in a folded-out state.

Figure 4:
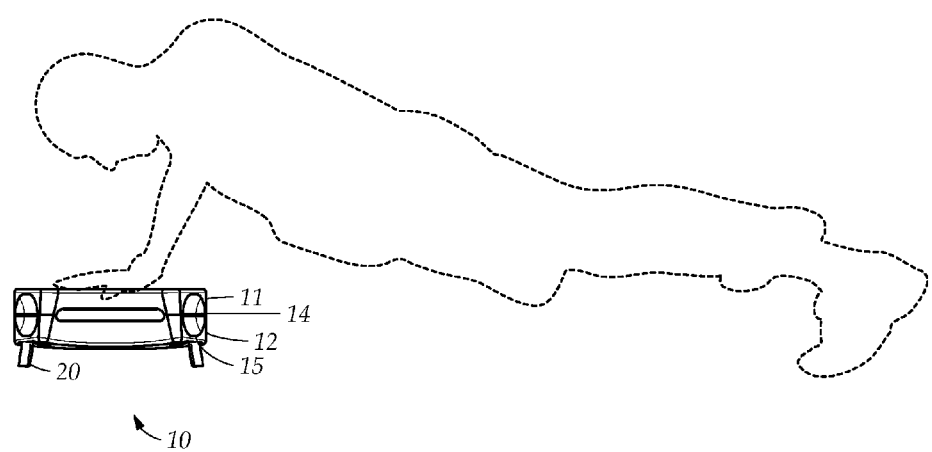
FIG. 4 is an example illustration of a push-up exercise a user of a portable multi-purpose exercise device can perform according to the present invention.

FIG. 4 is an example illustration of a push-up exercise a user of a portable multi-purpose exercise device can perform according to the present invention.

A user of device 10 can fold-out legs 20 and perform push-ups by pushing up against the upper external portion of upper portion 11. Note that handles 22 allow device 10 to stand on legs 20 without interference.

Figure 5:
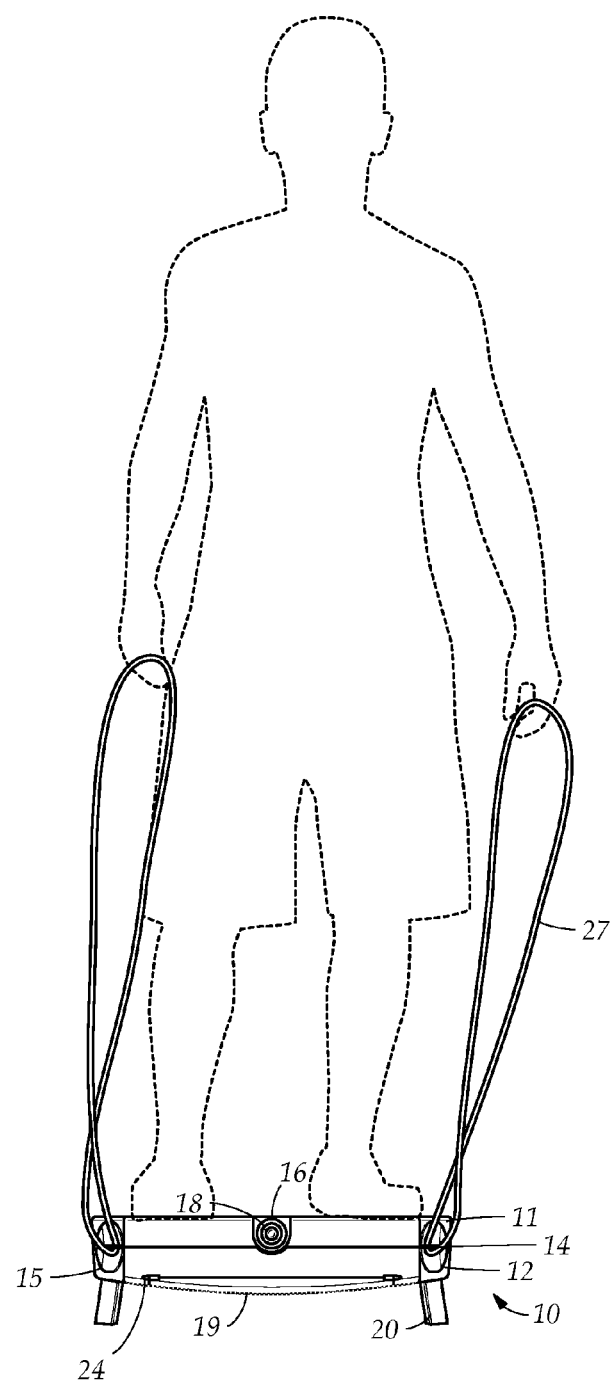
FIG. 5 is an example illustration of a resistance band exercise a user of a portable multi-purpose exercise device can perform according to the present invention.

FIG. 5 is an example illustration of a resistance band exercise a user of a portable multi-purpose exercise device can perform according to the present invention.

A user of device 10 can stand on the upper external portion of upper portion 11 and use a plurality of looped resistance bands 27 to perform resistance exercises.

Figure 6:
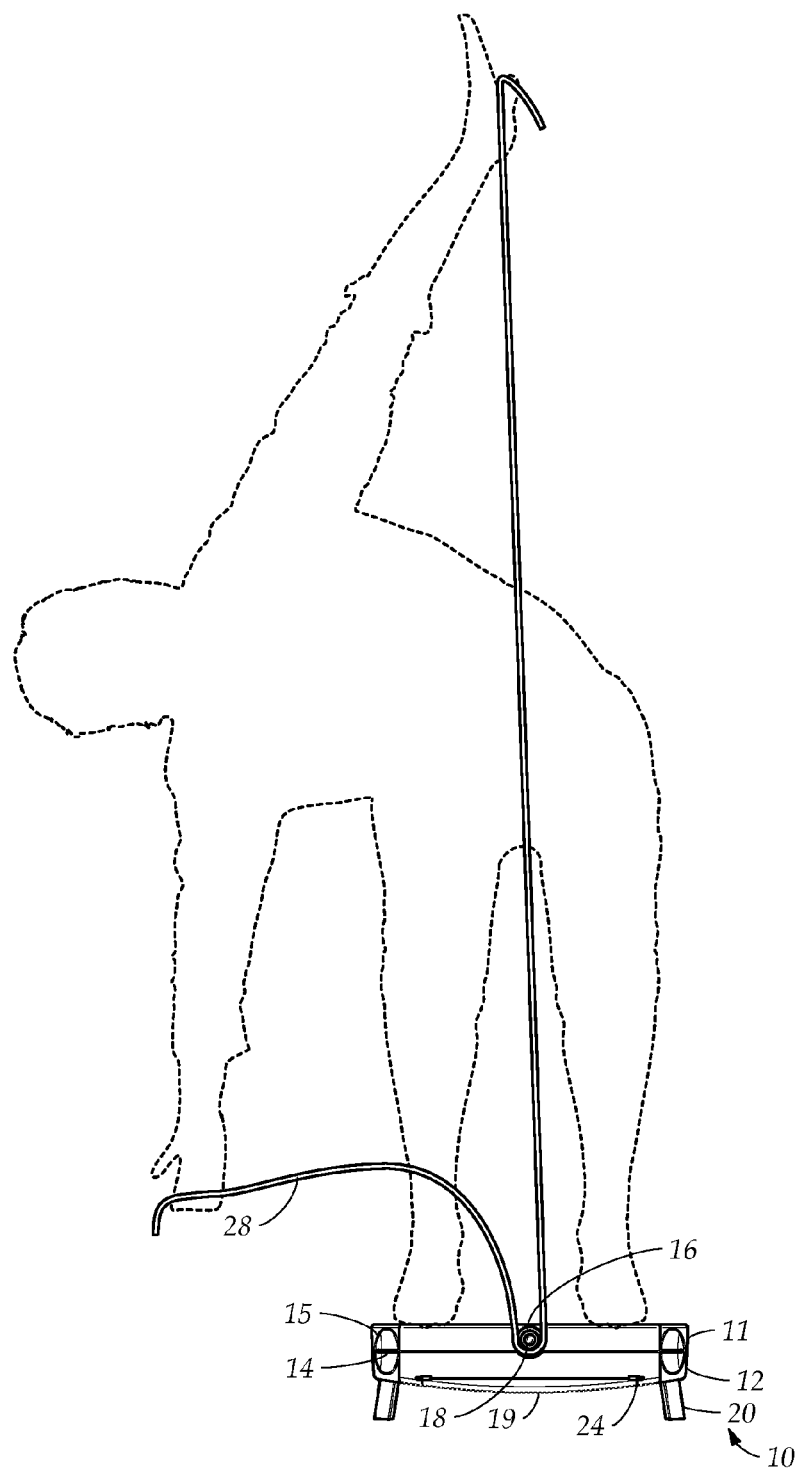
FIG. 6 is an example illustration of a pump wheel exercise a user of a portable multi-purpose exercise device can perform according to the present invention.

FIG. 6 is an example illustration of a pump wheel exercise a user of a portable multi-purpose exercise device can perform according to the present invention.

A user of device 10 can stand on the upper external portion of upper portion 11 and, via wheel 16, use a rope 28 to perform rope exercises.

Figure 7:
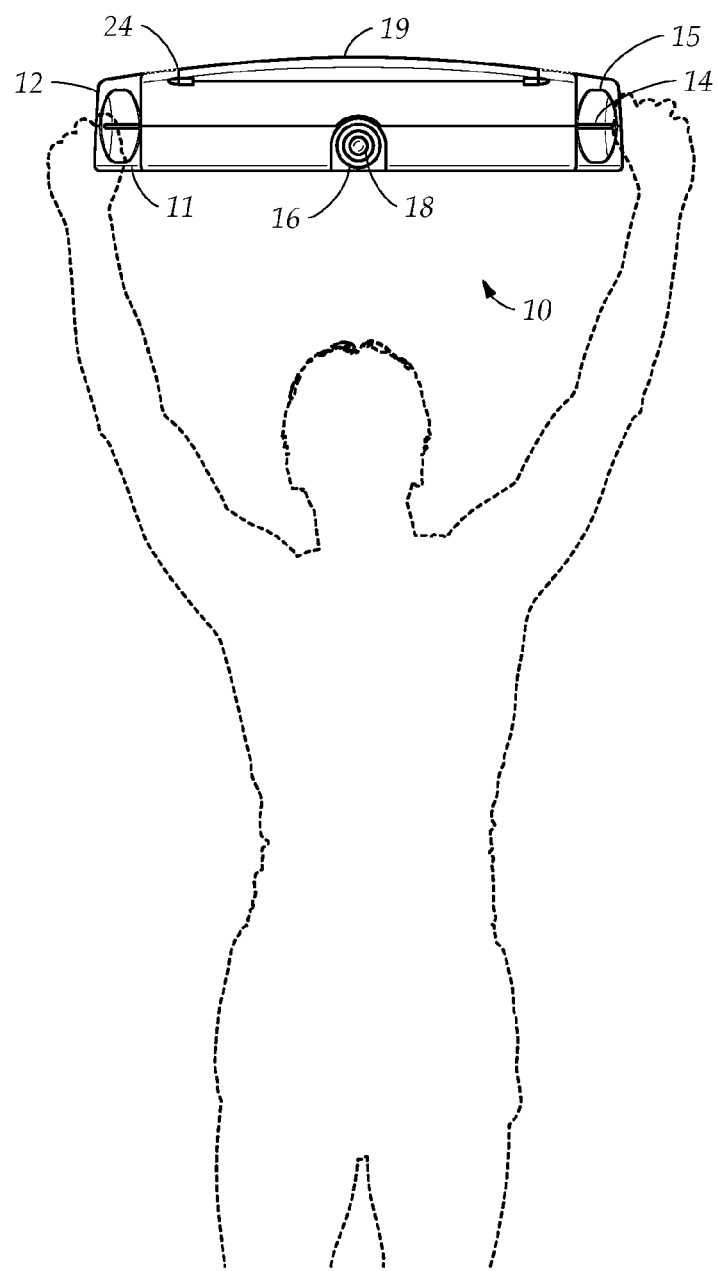
FIG. 7 is an example illustration of a flex grip exercise a user of a portable multi-purpose exercise device can perform according to the present invention.

FIG. 7 is an example illustration of a flex grip exercise a user of a portable multi-purpose exercise device can perform according to the present invention.

A user of device 10 can hold device 10 by handles 13 and lift device 10 over his head. To adjust a weight of device 10, the user can adjust an amount of content stored within the internal space of device 10. Although the user is holding device 10 with cover 19 facing upward, the user can also hold device 10 with cover 19 facing downward, even with weights stored within the interior space as snap 24 keeps cover 19 securely closed.

Figure 8:
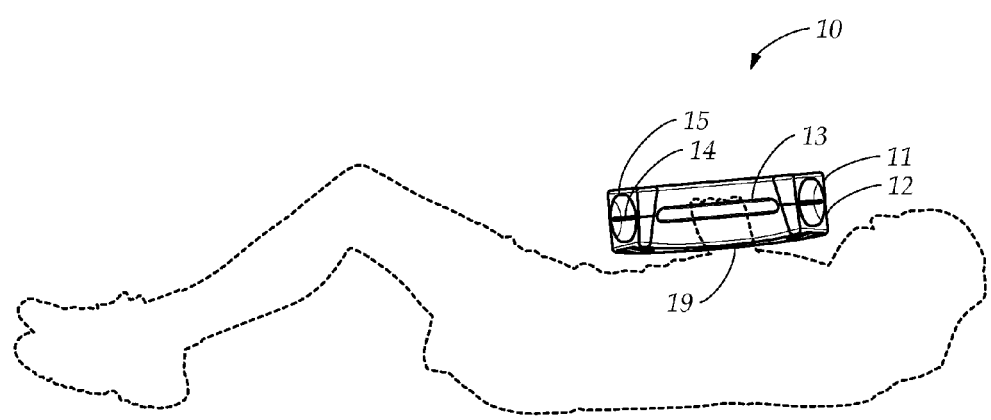
FIG. 8 is an example illustration of a sit-up exercise a user of a portable multi-purpose exercise device can perform according to the present invention.

FIG. 8 is an example illustration of a sit-up exercise a user of a portable multi-purpose exercise device can perform according to the present invention.

A user of device 10 can hold device 10 by handles 13 in front of his chest and perform sit-ups using device 10 as a weight. To adjust the weight of device 10, the user can adjust the amount of content stored within the internal space of device 10.

Figure 9:
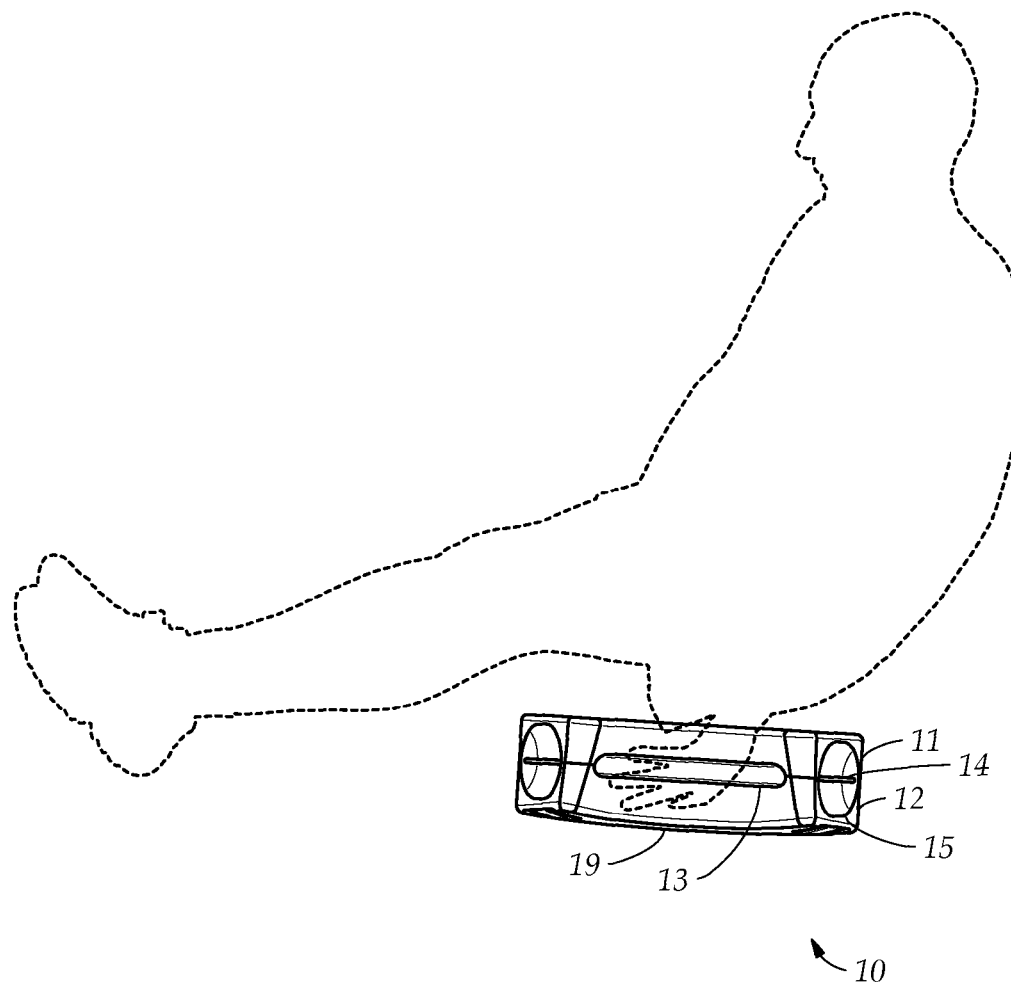
FIG. 9 is an example illustration of a frog kick exercise a user of a portable multi-purpose exercise device can perform according to the present invention.

FIG. 9 is an example illustration of a frog kick exercise a user of a portable multi-purpose exercise device can perform according to the present invention.

A user of device 10 can sit on the upper external portion of upper portion 11, hold onto device 10 by handles 13 and attempt to maintain a balanced position via cover 19, which is outwardly curved.

Figure 10:
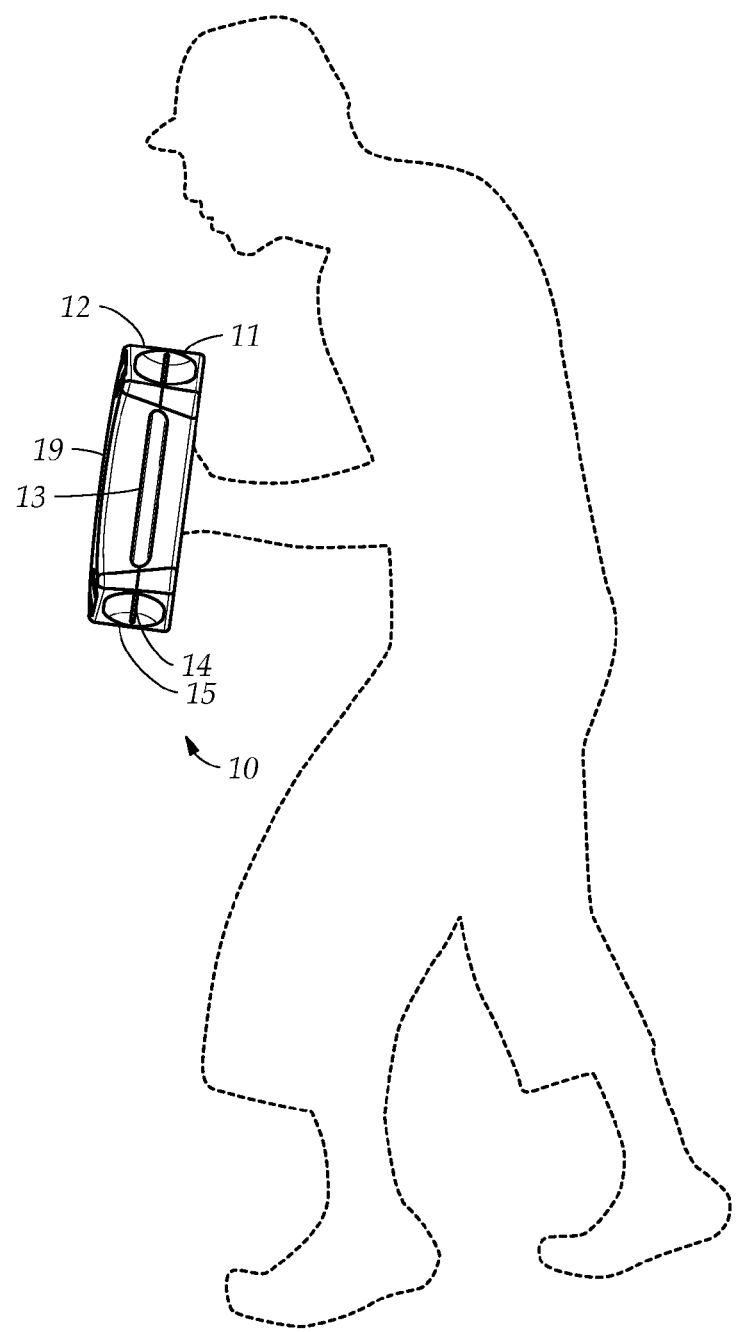
FIG. 10 is an example illustration of a flex grip exercise a user of a portable multi-purpose exercise device can perform according to the present invention.

FIG. 10 is an example illustration of a flex grip exercise a user of a portable multi-purpose exercise device can perform according to the present invention.

A user of device 10 can hold device 10 by handles and move device 10 away from him and towards him. To adjust the weight of device 10, the user can adjust the amount of content stored within the internal space of device 10.

Figure 11:
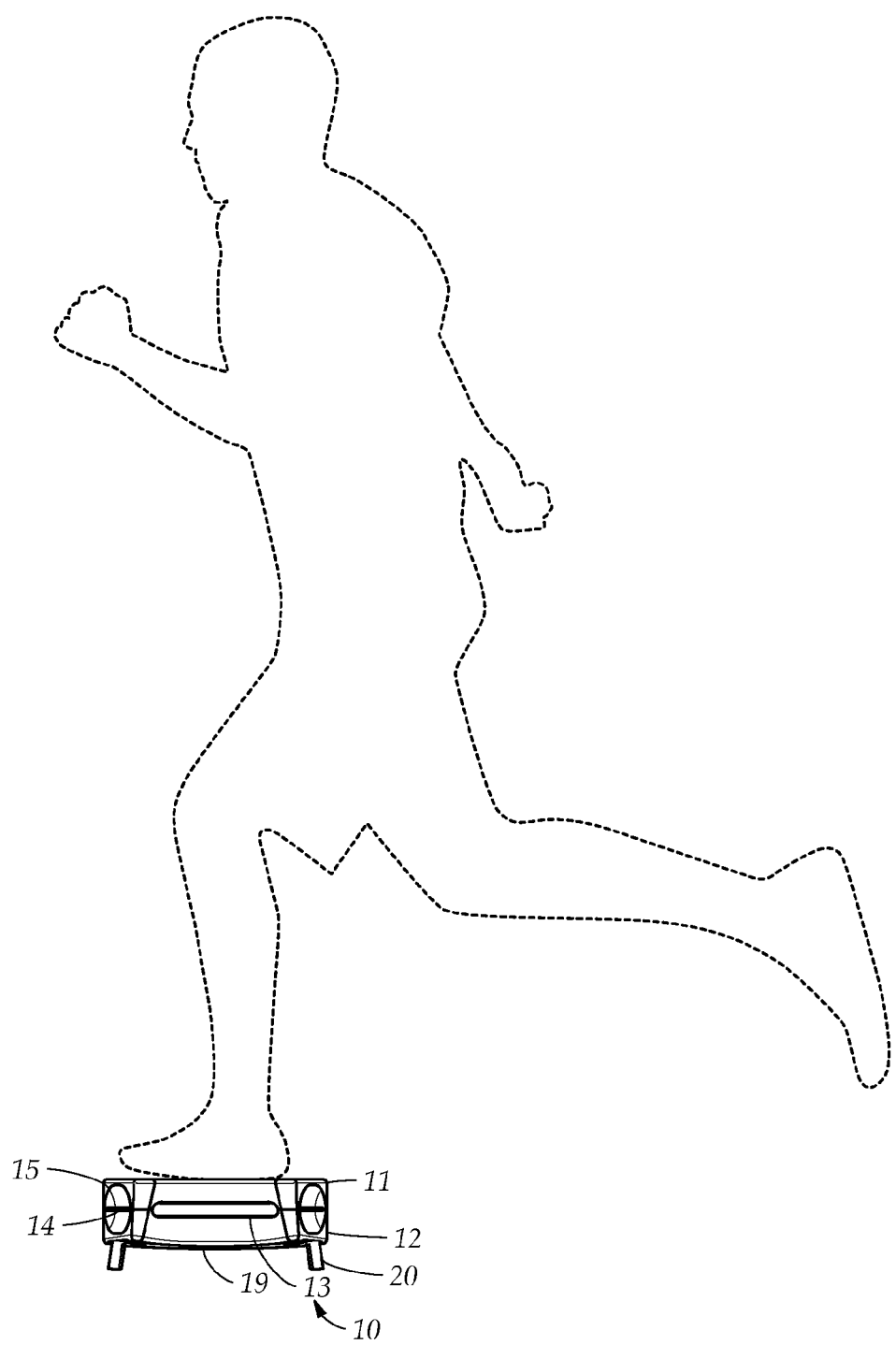
FIG. 11 is an example illustration of a flex stepper exercise a user of a portable multi-purpose exercise device can perform according to the present invention.

FIG. 11 is an example illustration of a flex stepper exercise a user of a portable multi-purpose exercise device can perform according to the present invention.

A user of device can fold-out legs 20 and perform a variety of stepping exercises.

A skilled artisan recognizes that other types of exercises can also be performed. For example, some of the exercises are similarly directed to slow and high intensity controlled movements utilizing push and pull techniques, tension band resistance training, symmetrical two handed exercises that promote reflex power and leg and calf step training capabilities. Examples of exercises include bent over rows, calf raises, chest crosses, rear leg extensions, cross country, bent over rows, two arm curls, triceps extensions, mountain climber, grip, sun circles, one/two arm raises, stepper, frog kicks, superman, triceps kickbacks, kneeling shoulder press, lumberjack saw, side grip push, plate lunge, wheel bent over rows, wheel curls, wheel rear deltoids extensions, wheel side laterals, wheel triceps extensions, squats and squat twists.

In conclusion, herein is presented a portable multi-purpose exercise device. Embodiments of the present invention are illustrated by example in the drawing figures and throughout the written description. It should be understood that numerous variations are possible, while adhering to the inventive concept without departing from the broader spirit and scope of the invention as set forth in the claims that follow. Such variations are contemplated as being a part of the present invention.

What is claimed is:

1. A portable multi-purpose exercise device, the device comprising:
   a base having a top side and a bottom side, a portion of the bottom side projects away from the top side, the base is hourglass shaped along a base length, the base has an interior space defined therein, the interior space includes a plurality of compartments, the bottom side includes a cover covering the interior space, a central portion of the cover projects away from the top side, the cover is removable, the cover is hourglass shaped;
   a plurality of foldable legs coupled to the bottom side;
   a plurality of rotatable handles coupled to the base, the rotatable handles are accessible from the bottom side, the rotatable handles avoid contact with a ground surface when the legs are in contact with the ground surface;
   a plurality of side handles coupled to a plurality of handle sides of the base, each handle side is adjacent to the top side and the bottom side;
   a shaft coupled to a shaft side of the base, the shaft side is adjacent to the top side and the bottom side;
   a pulley rotatable element mounted on the shaft, the pulley element is a wheel; and
   a plurality of inward bowl-like projections stationed on a plurality of corners of the base, each projection includes a pin extending from one side of the projection to another side of the projection;
   wherein the handle sides are adjacent to the shaft side, the legs fold into a plurality of grooves within the base, one of the grooves is adjacent to one of the rotatable handles, one of the grooves is adjacent to a first compartment, a second compartment is between the rotatable handles, and the second compartment is hourglass shaped.

2. The device of claim 1, wherein the top side includes a slip resistant portion, the base is hourglass shaped along a base width, the shaft is coupled in the center of the shaft side, the side handles project away from each other, and the cover is secured via a snap.

3. The device of claim 2, wherein the base width and the base length are different from each other, an island is stationed within the slip resistant portion, and the pin swings outward.

4. The device of claim 3, wherein the shaft side includes a wheel groove, the wheel rotates within the wheel groove, the slip resistant portion includes a weight scale or a calorie counter, the island includes a scale display, the plurality of legs includes four legs, and the base includes a processor.

5. A portable multi-purpose exercise device, the device comprising:
   a base having a top side and a bottom side, the top side includes a slip resistant portion, a portion of the bottom side projects away from the top side, the base is hourglass shaped along a base length or along a base width, the base has an interior space defined therein, the interior space includes a plurality of compartments, the bottom side includes a cover covering the interior space, a central portion of the cover projects away from the top side, the cover is removable, the cover is hourglass shaped, the slip resistant portion includes a scale, the base includes a processor;
   a plurality of side handles coupled to a plurality of handle sides of the base, each handle side is adjacent to the top side and the bottom side, the side handles project outward;
   at least four foldable legs coupled to four distinct corners of the bottom side, the legs fold into a plurality of grooves within the base;
   a plurality of rotatable handles coupled to the base, the rotatable handles are accessible from the bottom side, the rotatable handles avoid contact with a ground surface when the legs are in contact with the ground surface, one of the grooves is adjacent to one of the rotatable handles;
   a shaft coupled to a shaft side of the base, the shaft side is adjacent to the top side and the bottom side, the shaft side includes a wheel groove, the handle sides are adjacent to the shaft side;
   a pulley wheel mounted on the shaft, the wheel rotates within the wheel groove; and
   a plurality of inward bowl-like projections stationed on a plurality of corners of the base, each projection includes a pin extending from one side of the projection to another side of the projection.

6. The device of claim 5, wherein one of the grooves is adjacent to a first compartment, and the slip resistant portion includes a calorie counter.

7. The device of claim 6, wherein a second compartment is between the rotatable handles, and the body includes a network communication card.

8. The device of claim 7, wherein the second compartment is hourglass shaped, and the scale is powered via a rotational movement of at least one of the rotatable handles.

* * * * *